United States Patent Office 3,458,321
Patented July 29, 1969

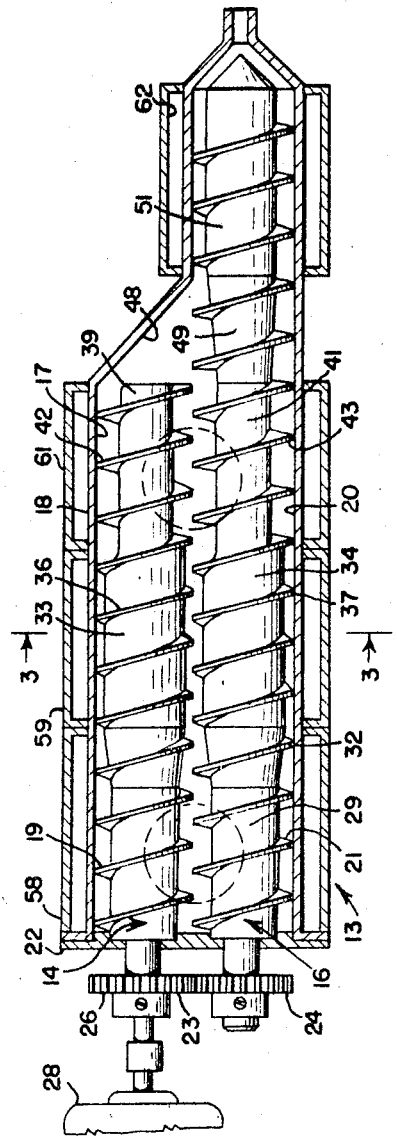
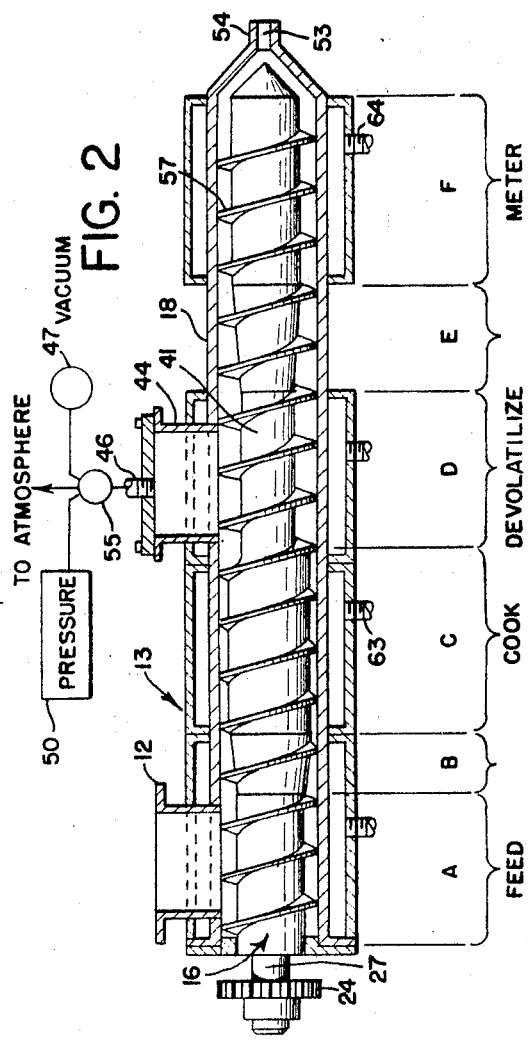
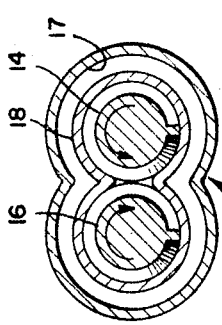
INVENTORS
RICHARD D. REINHART
ROBERT W. STEPHNSON
BY
ATTORNEY

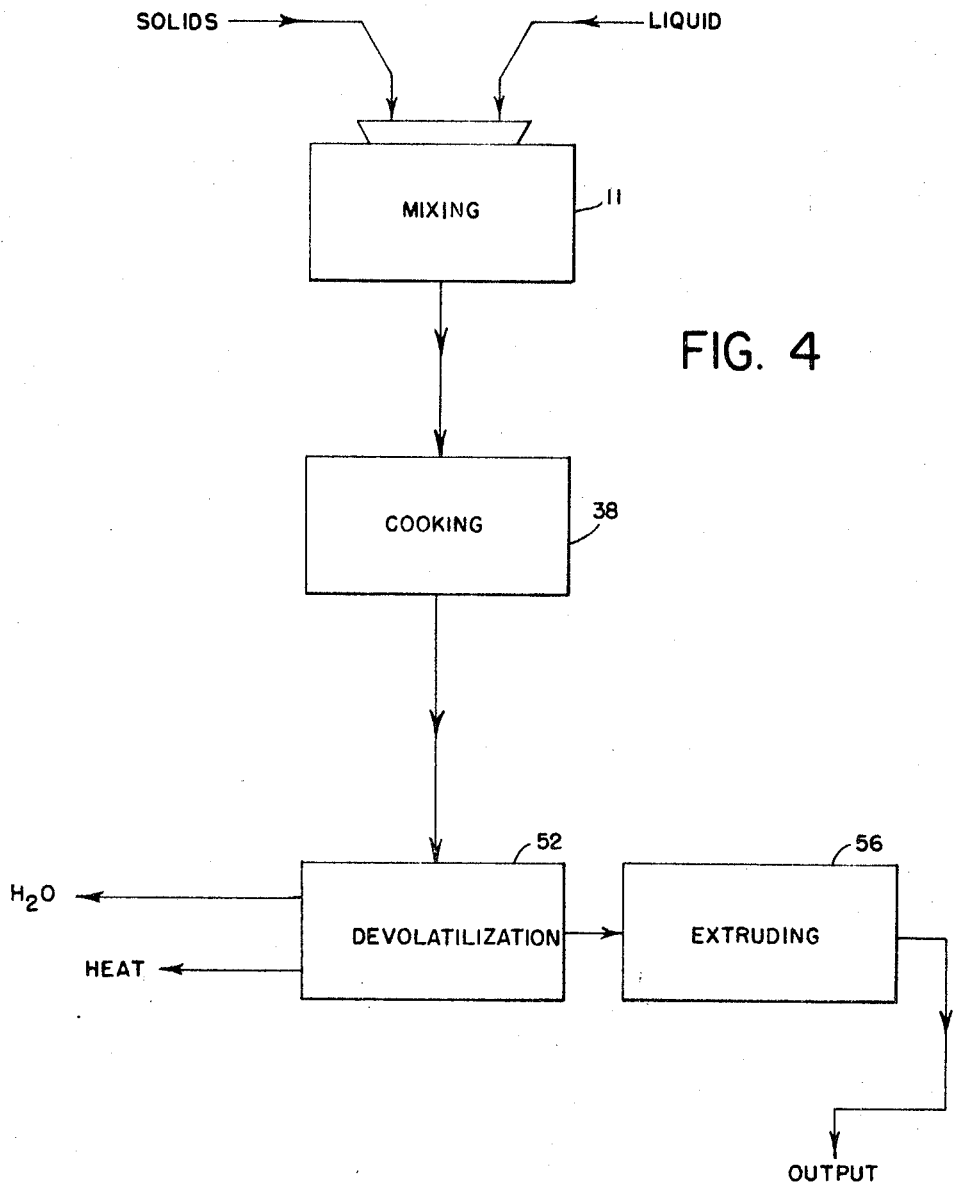

3,458,321
METHOD FOR EXTRUSION COOKING OF FOOD PRODUCTS
Richard D. Reinhart and Robert W. Stephenson, Minneapolis, Minn., assignors to General Mills, Inc., a corporation of Delaware
Filed June 2, 1966, Ser. No. 554,864
Int. Cl. A23l 1/10
U.S. Cl. 99—80                          10 Claims

ABSTRACT OF THE DISCLOSURE

A method for continuously mixing, cooking and extruding food products in which the food material is subjected to high compressive and shearing forces in order to raise the temperature and thereby cook the material. The compressive force are then released to flash moisture from and thereby cool and partially dry the cooked material which is then extruded.

---

This invention relates to a method for processing food products and more particularly to a method for continuously mixing, cooking, devolatilizing and extruding food products.

In the past cooking methods have been characterized by relative inconvenience. The cooking was carried out and required long periods of time to begin operation and equally long periods for termination of operations. Further, the methods usually called for long residence time in cookers, frequently in excess of one hour. Such characteristics are undesirable. The long start up and shutdown periods are expensive in terms of manpower and time. The long periods of residence of the food product in a cooker prevents immediate and effective response to changes in formulation and operating conditions with the result that control of product quality is impaired.

Accordingly, it is an object of the present invention to provide a new and improved method for treating food products.

It is another object of the present invention to provide a new and improved method for continuously mixing, cooking, devolatilizing and extruding food products.

It is a further object of the present invention to provide a new and improved method for treating food products by devolatilizing the food product after the product has been cooked in order to cool and dry the food product in preparation for extrusion thereof.

It is a further object of the present invention to provide a new and improved method for mixing, cooling, devolatilizing, and extruding cereal grains in order to produce a cooked product of uniform high quality with a palatable flavor and texture.

Further objects and advantages of the invention will become apparent from the following description and drawings wherein;

FIGURE 1 is a sectional view in plan, illustrating a specific form of an apparatus carrying out the process of the present invention, FIG. 2 is a front sectional view of the apparatus illustrated in FIGURE 1, FIG. 3 is a cross sectional view taken along line 3—3 of FIGURE 1, and FIG. 4 is a block diagram of a process for treating food products.

For the purpose of illustrating the principles of this invention, the invention will be described with respect to the processing of cereal grain products. It is to be understood, however, that other food materials are contemplated by the invention. For example, the material which may be processed might include various vegetables, both leafy and root varieties. Preferably, the vegetables would be prepared in dehydrated form so that the vegetables could be effectively mixed with other solid materials prior to introduction into the apparatus described herein.

Cereal grain such as corn is ground by conventional methods to produce a corn flour or other desired granulation. These corn solids are normally dehydrated to a relatively low moisture content. If a breakfast cereal type product is to be produced, this ground corn product is then mixed with other solids such as sugar, flavoring, preservatives and the like. These dry ingredients or solids are then introduced together with a liquid which includes a substantial portion of water into a mixer. Refer to FIGS. 1 and 4 of the drawings. The solids and the liquid are mixed (see block 11 of FIG. 4). This mixing can take place by the usual methods or preferably the mixing can be accomplished by introducing the solids and liquid into the input 12 of a twin screw cooking apparatus generally designated by the numeral 13.

The solids and liquid may be separately introduced into the input 12 or the solids and liquids can be combined and introduced into the input 12 in a single stream. In either case the food product, including the liquid, is introduced between a pair of augers or screws generally designated by the numerals 14 and 16. These augers 14 and 16 are mounted within communicating bores 17 and 20 of a casing 18. The augers 14 and 16 extend substantially throughout the length of the bores and contain helical flights 19 and 21 respectively which cooperate to mix and otherwise work the food product.

The augers 14 and 16 are mounted in a mounting plate 22 which in turn is connected to casing 18. Gears 23 and 24 respectively are attached to shafts 26 and 27 so that the augers can be driven by a motor 28. The motor 28 is connected directly to one of the gears 23 which in turn drives auger gear 24. With this arrangement, the augers turn in the arrow directions indicated in FIG. 3 of the drawings. With the augers 14 and 16 thus co-acting, the food ingredients introduced into the input are drawn down between the flights of the augers by the action of the helical flights 19 and 21 where the ingredients are thoroughly mixed due to the twisting, kneading, and working forces generated by the flights 19 and 21.

This mixing feed section A is illustrated in FIG. 2 of the drawings and is utilized for insuring that the ingredients are thoroughly mixed to produce a homogeneous mass of material which is suitable for further processing.

The word "section" will be used when reference is made to a particular part of the augers and the word "zone" will be used when reference is made to a particular part of the entire appaartus including the corresponding particular section of the augers.

It is noted that the stem 29 of the feed end of each of the augers 14 and 16 located in the feed zone A, is of intermediate diameter. The stem 29 should be sufficiently small in diameter to provide sufficient space between the stem and the bore 17 of the casing 18 in order to proivde sufficient capacity for mixing the ingredients. On the other hand, the stem 29 should be of sufficiently large diameter to insure thorough agitation and compression of the food ingredients in order to insure adequate mixing of the product between the flights 19 and 21 respectively.

The flights 19 and 21 of the feed section A of each of the augers are pitched to move the food ingredients toward a transition section in zone B as the material or ingredients are being mixed. At the transition section, the stem diameter of each of the augers is gradually increased as noted in FIGS. 1 and 2. In the transition zone B, the pressure applied to the ingredients is increased due to the fact that the flights 31 and 32 in the transition zone are more shallow thus forcing the ingredients into a smaller space between the flights. The transition zone is of substantial length in order to gradually apply pressure to the product and to insure a uniform flow of the mixed ingredients from the feed or mixing zone A into a pressurized condition. The transition section is immediately followed by a cooking section in zone C in which the root diameter 33 and 34 respectively of augers 14 and 16 is substantially increased thus reducing the space between flights 36 and 37. This substantial reduction in the space between the bores 17 and 20 and the reduced space existing between the augers 14 and 16 in the cooking zone C results in application of a great deal of pressure to the food ingredients. This application of compressive and shearing forces to the food results in generation of substantial temperatures in the ingredients due to increased working of the product. Further, the flights 36 and 37 apply twisting, compression, and kneading forces to the ingredients in the cooking zone thus generating additional heat due to friction. The pressure applied to the food may be over 1000 p.s.i. and is frequently several thousand p.s.i. There is sufficient heat developed in this cooking zone to raise the temperature to a substantial degree sufficient to cook the food product in zone C. The product is thoroughly and uniformly cooked in the cooking zone C due to the fact that the flights 36 and 37 continuously applying mixing action to the product as the product is moving through the cooking zone C. This continuous mixing action not only generates heat but also insures that the temperature of the product throughout the cooking zone is uniform thus resulting in a uniform application of heat throughout the mass of food ingredients to uniformly cook the product.

After the cooking step 38, the food product is forced by the auger flights 36 and 37 into a devolatilization zone D. Refer to FIG. 2 of the drawings. In this zone, the stem diameter 39 and 41 of the respective augers is substantially reduced below that of the previous sections of the auger. The diameter of the stems 39 and 41 is reduced with no change in the pitch of the flights 42 and 43. Therefore, a great deal more space is provided between the bore and the stems of the augers thus relieving the pressure applied to the food ingredients in the cooking section C.

A devolatilization port 44 is provided in the apparatus and extends through the housing 18 and communicates directly with the devolatilization zone D. This devolatilization port 44 may be open to the atmosphere or it may be connected via line 46 to a vacuum pump 47 or to a pressure generator 50. A valve 55 may be used to control the pressure condition desired. As the pressure is released by the varying diameter of the stems 39 and 41 and the deepening of the flight, the food ingredients are also subjected to reduced pressure by devolatilization port 44. High pressure is applied to the product in the cooking zone C which is sufficient to raise the temperature of the product, and consequently the moisture in the product, to more than the boiling point of water. The devolatilization port 44 permits some of this heated moisture to escape from the depressurized food ingredients through the port 44. This removal of moisture from the food ingredients has two effects on the product. First, the removal of moisture from the product tends to cool the product. Secondly, the removal of moisture reduces the overall moisture content of the food product. Thus it can be seen that the devolatilization zone of the apparatus provides a method for reducing the temperature of the product so that it will not puff or expand upon extrusion if such is desired and further, it removes excess moisture from the product prior to extrusion. Control of temperature and product moisture is thereby achieved.

The zones A through D of the apparatus contain twin augers 14 and 16 which have identical configurations in each of the zones A through D. This will be noted in FIGURE 1 of the drawings. Beyond the devolatilization zone, however, the auger 14 no longer duplicates auger 16. Auger 14 is terminated at the end of the devolatilization zone and the bore 17 of casing 18 is also terminated. The bore 17 is terminated by a plow 48 which guides food ingredients from the devoaltilization zone B of auger 14 to the transition zone E of auger 16. The transition section of the auger in zone E contains a stem diameter which increases and forces the food ingredients into a feeding zone F where the auger has a stem 51 which is substantially larger in diameter than the stem 41 in the devolatilization zone. In the feed or meter zone F, pressure is applied to the food ingredients in order to force the food ingredients out the aperture 53 in die 54. The food product can be extruded from the aperture 53 either in a puffed or an unpuffed condition depending upon the cooling which is accomplished partially in the devolatilization zone D. For instance, the devolatilization can be carried out to a sufficient extent to reduce the temeprature of the product below 212° F. This will prevent puffing of the extruded product. Also, by merely altering the characteristics of the flights 57 in the metering zone F, sufficient pressure can be placed on the food product in order to raise the temperature to the point where the food product will puff upon extrusion from the die 54. Also, the temperature reduction in the devolatilization step 52 can be restricted so that the temperature of the dough does not drop below 212° F. This also will result in a food product which puffs as it is extruded due to expansion of the heated moisture in the product.

Temperature control along the length of the apparatus is desirable in order to produce a product having suitable flavor, nutritive, and esthetic characteristics. This temperature control is achieved by regulating the temperature in each of the zones A through F along the length of the apparatus. The primary temperature control is achieved by designing the individual augers 14 and 16 as described in order to achieve the increase or reduction of temperature in the zone desired. For instance, very little heat is developed in the feed zone whereas a substantial temperature increase is generated in the cooking zone where the food ingredient is gelatinized or cooked to the proper degree. In the devolatilization zone, the cooked food is dried and cooled by making use of the devolatilization step 52. Further, precise control of the temperature along the length of the apparatus can be achieved by placing heat jackets around the casing 18 and compartmenting the jackets so that they coincide with the various zones where temperature changes are desired. These heating or cooling jackets are illustrated in FIGS. 1, 2, and 3 of the drawings. The jackets 58, 59, 61 and 62 are positioned to coincide generally with feed zone A, cooking zone C, devolatilization zone D, and metering zone F respectively. With the temperature control jackets associated with the zones as set forth, heated or cooled fluid may be circulated in each of the jackets to regulate the temperature within the particular zone. For instance, if additional heat is needed for cooking the food product, hot water may be introduced into jacket 59 through an input opening 63 in order to add heat to the cooking zone. If additional cooling is necessary in the metering zone F, then cool water may be introduced through input 64 in order to reduce the temperature of the dough or food ingredients prior to extrusion thereof. Each of the zones is meant to be independent in order that all of the zones can be operated with hot water or steam or a similar fluid or the zones can be independently controlled. Some zones may utilize a cooling medium while some of the zones use a heat medium. It must be pointed out, however, that most of the heat generated for the cooking zone is generated by the mechanical friction and pressure developed by the cooking section of the augers 14 and 16 respectively and additional heat is not normally necessary for satisfactory operations of the cooker. Additional heat will be desirable for lending precise control to the cooking temperature.

It has been found that in the processing of food products, that normally the temperature ranges desired in the various zones of the apparatus are substantially as follows. In the feed zone, the ingredients and liquid mixed or unmixed may be introduced at room temperature. The resulting moisture content of the mixture may be from about 20 to about 40% by weight. The ingredients are heated in the transition zone B to a temperature of about 240° F. to about 300° F. (If raw vegetables are processed, the lower temperature may be about 225° F.) The heat is generated primarily by the increased mechanical working of the ingredients in the transition zone if an apparatus as illustrated in FIGS. 1 through 3 is utilized. In the cooking zone a temperature range of about 287° F. (about 245° F. in the case of vegetables) to about 331° F. has been found to develop the taste quality and appearance of the product, especially cereal grains and corn, so that a finished product of high quality results. The temperature range in the devolatilization zone has been found to be about 200° F. (about 125° F. for vegetables) to about 325° F. It is noted here that the lower portion of the range will involve products which are not desired in the puffed condition. The higher range will include products where some puffing will occur but in each case, the high and lower range, there will be some drying which takes place in the devolatilization zone. The moisture loss will be about ½% to about 10% by weight by the product. The acceptable temperature range for the transition zone E is 108° F. to about 250° F. The temperature range for the metering zone F has been found to be about 105° F. to about 240° F. This temperature profile provides sufficient temperature control to produce an extruded product having various taste, color, and appearance characteristics.

A more complete understanding of the invention can be appreciated from the following examples.

EXAMPLE I

A ready-to-eat cereal breakfast food was produced using corn and rice. Corn and rice were reduced to desired granulation for processing, and were then mixed with other ingredients in the following proportions:

| Ingredients: | Percent |
|---|---|
| Corn | 82.6 |
| Sugar | 9.5 |
| Rice | 4.6 |
| Salt | 2.5 |
| Malt | 0.8 |
| | 100.0 |

These ingredients were thoroughly mixed to produce a substantially homogeneous blend of the materials. The above mixture was then combined with sufficient water to raise the moisture content of the entire mix to about 27% moisture by weight. This mixture of solids and liquids was introduced into the feed zone of a mixer where the solids and liquids were thoroughly mixed. The mixture was then introduced into a cooking zone C of an apparatus as illustrated in FIGS. 1 through 3. The temperatures in the various zones were as follows:

| | Temp., °F. |
|---|---|
| Zone A | (1) |
| Zone B | 265 |
| Zone C | 313 |
| Zone D | 313 |
| Zone E | 242 |
| Zone F | 238 |

1 Substantially room temperature.

The apparatus was operated so that the auger rotated at about 50 revolutions per minute and with a die pressure of approximately 1550 pounds per square inch. The pressure on the product was then released to atmospheric pressure at a devolatilization port. The product was then extruded through a die after which the product was dried, flaked, and toasted by conventional methods. A 71° temperature drop occurred in the product at the devolatilization port.

It should be pointed out here that the moisture range for cooking the product in the cooking zone C is normally in the range of about 25 to about 25% by weight of the ingredients. A more preferred range for cereal food ingredients which are introduced in a dry solid state has been found to be in the range of about 27% to about 30% by weight.

EXAMPLE II

A second ready-to-eat breakfast cereal was prepared by combining dry granular ingredients as follows.

| Ingredients: | Percent |
|---|---|
| Corn | 87.2 |
| Sugar | 9.5 |
| Salt | 2.5 |
| Malt | 0.8 |
| | 100.0 |

These ingredients were combined with sufficient water to raise the moisture content by weight of the mixture to about 30%. This combination was then fed into an apparatus as illustrated in FIGS. 1 through 3. The blended and mixed ingredients were then conveyed through the auger cooker in which the temperature profile of the zones was as follows:

| | Temp., °F. |
|---|---|
| Zone A | (1) |
| Zone B | 275 |
| Zone C | 305 |
| Zone D | 230 |
| Zone E | 175 |
| Zone F | 170 |

1 Room temperature.

The devolatilization zone D was connected to a vacuum so that the cooked food ingredients were subjected to a vacuum thereby increasing the moisture loss in the devolatilization zone and achieving a substantial temperature reduction. The apparatus was operated at 50 r.p.m. and had a die pressure of 2500 pounds per square inch. The vacuum in the devolatilization port was approximately 20 inches of mercury. The product was extruded through a die after which it was dried, flaked and toasted in the usual manner. The moisture loss was about 5.6% by weight and a 55° temperature drop occurred at the devolatilization port.

EXAMPLE III

The ingredients for Example III were exactly the same as those in Example II and were mixed in the same way. The blended and mixed ingredients were conveyed through the auger cooker in which the temperature profile of the various zones was as follows:

| | Temp., °F. |
|---|---|
| Zone A | (¹) |
| Zone B | 275 |
| Zone C | 310 |
| Zone D | 315 |
| Zone E | 220 |
| Zone F | 190 |

¹ Room temperature.

The devolatilization zone D was connected to a pressure system so that the cooked food ingredients were subjected to a super atmospheric pressure of nine (9) pounds per square inch. The apparatus was operated at 50 r.p.m. The product was extruded through a die after which it was dried, flaked and toasted in the usual manner. The moisture loss in the devolatilization port was 5.2% by weight and a 95° temperature drop occurred in the product.

EXAMPLE IV

The product in Example IV was exactly the same as that in Example III and the ingredients were mixed and conveyed through the auger in the same manner. The following was found to be the temperature profile of the various zones:

| | Temp., °F. |
|---|---|
| Zone A | (¹) |
| Zone B | 273 |
| Zone C | 308 |
| Zone D | 308 |
| Zone E | 232 |
| Zone F | 195 |

¹ Room temperature.

The devolatilization zone D was opened to atmospheric pressure so that the cooked food ingredients lost about 5.6% moisture by weight with an accompanying temperature reduction of about 76°. The apparatus was operated at 50 r.p.m. The product was extruded through a die after which it was dried, flaked and toasted in the usual manner.

EXAMPLE V

This example involves processing of raw carrots containing about 35% moisture by weight. The moist granulated carrots were introduced into the feed section of an auger from which the carrots were moved throughout the processing apparatus. The temperature profile of the various zones in the apparatus was as follows:

| | Temp., °F. |
|---|---|
| Zone A | (¹) |
| Zone B | 225 |
| Zone C | 245 |
| Zone D | 265 |
| Zone E | 145 |
| Zone F | 125 |

¹ Room temperature.

The devolatilization zone D was opened to atmospheric pressure and in this case, it prevents puffing of the product upon extrusion. The carrots were cooled in the devolatilization port by additional cooling so that a temperature drop to 120° occurred in the product. There was a moisture loss at the devolatilization port at about .08% by weight. The apparatus was operated at 50 r.p.m. The product was extruded through a die.

Thus it can be seen that the cooked product can be processed on a continuous basis by mixing, cooking, devolatilizing, and extruding the product to achieve a finished end product having desirable taste, appearance and color characteristics. The devolatilization step 52 as set forth in FIG. 4 of the drawings provides control over the process. As will be noted in Example II, the flashing of moisture from the heated product substantially reduces the temperature of the dough thereby permitting extrusion of the dough below the boiling point and thereby preventing puffing of the product. Devolatilization of the dough permits the operator to regulate the moisture content and temperature of the dough at the extrusion die. More or less moisture reduction can be achieved by varying the vacuum at the devolatilization part thus permitting precise control of the moisture content of the extruded product. Such control is important since it permits the extruded product to be flaked and toasted with reduced emphasis on drying of the product after extrusion.

Other products such as dried vegetables, dried leafy products and others may be processed in substantially the same way, as set forth in Example V, by simply reducing the products to a relatively dry granular form. This dry granular material can then be combined with additives such as sugar, salt, seasonings of all types, and similar ingredients in order to achieve a flavor balance desired for the finished product. These vegetable products can then be introduced into the apparatus and cooked and processed according to the methods noted herein in exactly the same way as set forth in connection with the ready-to-eat breakfast cereal. Some of the vegetables and leafy products are more sensitive to temperatures than cereal grains and therefore, the water jackets can be utilized to more precisely control the temperature of the apparatus during the processing of such products.

The above is merely illustrative of the principles of a method for processing food products. Many other variations of the process can be achieved which fall within the principles set forth above.

The embodiments of the invention in which an exclusive property or privilege is claimed are defined as follows:

1. Method of processing food products which comprises intermixing a food material and aqueous liquid subjecting the mixture to sufficiently high compressive and shearing forces for a period of time sufficient to generate temperatures in excess of 212° F. and thereby cook said mixture, releasing the compressive forces on said mixture to flash sufficient moisture from the mixture to cool and partially dry the mixture, and then extruding the cooled and partially dried food product.

2. A method in accordance with claim 1 in which the compressive forces are released to a pressure level in excess of atmospheric pressure.

3. A method in accordance with claim 1 in which the compressive forces are released to atmospheric pressure.

4. A method in accordance with claim 1 in which the compressive forces are released to a vacuum.

5. A method in accordance with claim 1 in which said food includes comminuted cereal products having a moisture content of about 20% to about 40% by weight after mixture with said liquid, in which said mixture is cooked at temperatures of about 287° to about 331° F. and in which sufficient moisture is flashed from said cooked mixture to reduce the temperature of said cooked mixture.

6. A method in accordance with claim 5 in which a major portion of said cereal products is corn.

7. A method in accordance wtih claim 5 in which the temperature of the cooked mixture is reduced below 212° F. to prevent puffing of said cereal product as it is extruded.

8. A method in accordance with claim 1 in which said food is raw vegetable having a moisture content of up to about 35% by weight, in which said vegetable is heated to a temperature of about 245° F. to about 331° F. and in which said vegetable is cooled simultaneously with flashing of moisture from the vegetable to reduce the temperature and moisture content of said vegetable.

9. A method in accordance with claim 1 in which the mixture is subjected to compressive and shearing forces generated by at least a pair of generally helical augers enclosed in a housing and in which the compressive forces are released by moving the mixture into a zone within the housing wherein the mixture will expand to release a quantity of the moisture contained in the mixture.

10. A method in accordance with claim 1 in which the mixture is subjected to compressive and shearing forces generated by a pair of generally helical augers enclosed in a housing which increases the temperature to more than 212° F. to cook the mixture, in which the compressive forces are released by moving the mixture into a zone in the housing wherein the mixture will expand to reduce the moisture content of the mixture by about ½% to about 10% by weight of the mixture and reduce the temperature of the mixture to about 108° F.–250° F., and in which the dried and cooled mixture is extruded by forcing the mixture through a die by subjecting the mixture to pressure with a helical auger mounted in a housing.

References Cited
UNITED STATES PATENTS

| | | | |
|---|---|---|---|
| 3,062,657 | 11/1962 | Vollink | 99—80 |
| 3,121,637 | 2/1964 | Clausi et al. | 99—80 |
| 3,150,978 | 9/1964 | Campfield | 99—80 XR |

RAYMOND N. JONES, Primary Examiner

JAMES R. HOFFMAN, Assistant Examiner

U.S. Cl. X.R.
99—100, 324; 259—6

UNITED STATES PATENT OFFICE
CERTIFICATE OF CORRECTION

Patent No. 3,458,321                                                      July 29, 1969

Richard D. Reinhart et al.

It is certified that error appears in the above identified patent and that said Letters Patent are hereby corrected as shown below:

Column 3, line 44, "applying" should read -- apply --. Column 6, line 24, "25%", second occurrence, should read -- 35% --. Column 7, line 63, "to" should read -- of --. Column 8, line 6, "part" should read -- port --.

Signed and sealed this 19th day of May 1970.

(SEAL)

Attest:

Edward M. Fletcher, Jr.

Attesting Officer

WILLIAM E. SCHUYLER, JR.

Commissioner of Patents